(12) United States Patent
Chen et al.

(10) Patent No.: US 6,842,456 B1
(45) Date of Patent: Jan. 11, 2005

(54) NON-ENCAPSULATION MOBILE IP

(75) Inventors: Xiaobao Chen, Eastleaze (GB);
Ioannis Kriaras, Bradenstoke (GB);
Andrea Paparella, Swindon (GB)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/512,004

(22) Filed: Feb. 24, 2000

(30) Foreign Application Priority Data

Feb. 26, 1999 (EP) .............................................. 99301437

(51) Int. Cl.$^7$ .......................... H04L 12/28; H04L 12/56
(52) U.S. Cl. ...................... 370/401; 370/352; 370/338; 370/466
(58) Field of Search ................................ 370/401, 331, 370/332, 338, 351, 352, 409, 392, 349, 353, 354, 355, 456, 365, 466, 467; 455/422, 432, 433, 436

(56) References Cited

U.S. PATENT DOCUMENTS

| | | | | |
|---|---|---|---|---|
| 5,862,345 A | * | 1/1999 | Okanoue et al. ............. | 709/238 |
| 6,130,892 A | * | 10/2000 | Short et al. .................. | 370/401 |
| 6,195,705 B1 | * | 2/2001 | Leung ......................... | 709/245 |
| 6,230,012 B1 | * | 5/2001 | Willkie et al. ............... | 455/435 |
| 6,501,746 B1 | * | 12/2002 | Leung ......................... | 370/338 |

OTHER PUBLICATIONS

Willkie et al. (US 20020159465A1) discloses IP mobility support proxy mobile node registration.*
C. Perkins, "Minimal Encapsulation Within IP", *Network Working Group, Request for Comments: 2004, Category: Standards Track*, IBM (Oct. 1996), pp 1–6.
C. Perkins, "IP Mobility Support", *Network Working Group, Request for Comments: 2002, Category: Standards Track*, IBM (Oct. 1996), pp 1–79.
Singh, R. et al "RAT: a quick (and dirty?) push for mobility support" Proceedings WMCSA '99, Second IEEE Workshop On Mobile Computing Systems And Applications, New Orleans, LA, Feb. 25–26, 1999, pp. 32–40, p. 32, left–hand column, paragraph 5, p. 33, right–hand column, paragraph 4, p. 37, right–hand column, paragraph 6, p. 38, left–hand column, paragraph 5.
Perkins, C.E. "Mobile IP", IEEE Communications Magazine, vol. 35, No. 5, May 1, 1997 pp. 84–86, 91–99, p. 85, left–hand column, paragraph 5, p. 86, right–hand column, paragraph 2, p. 92, right–hand column, paragraph 4—paragraph 7.

* cited by examiner

*Primary Examiner*—Ajit Patel

(57) ABSTRACT

A method is provided of directing an internet protocol (IP) packet to a mobile node. The mobile node has a home address in a home network and is temporarily connectable in a foreign network having a foreign agent. The IP packet has a header portion including the destination address to which the IP packet is to be sent. The method comprises the steps of: receiving, in the home network, the IP packet including a destination address corresponding to the home address of the mobile node; modifying the IP packet by removing the home address of the mobile node from the header portion of the IP packet and replacing it with the foreign agent care-of address, and appending a mobile node identifier to the IP packet, and transmitting the modified IP packet.

15 Claims, 9 Drawing Sheets

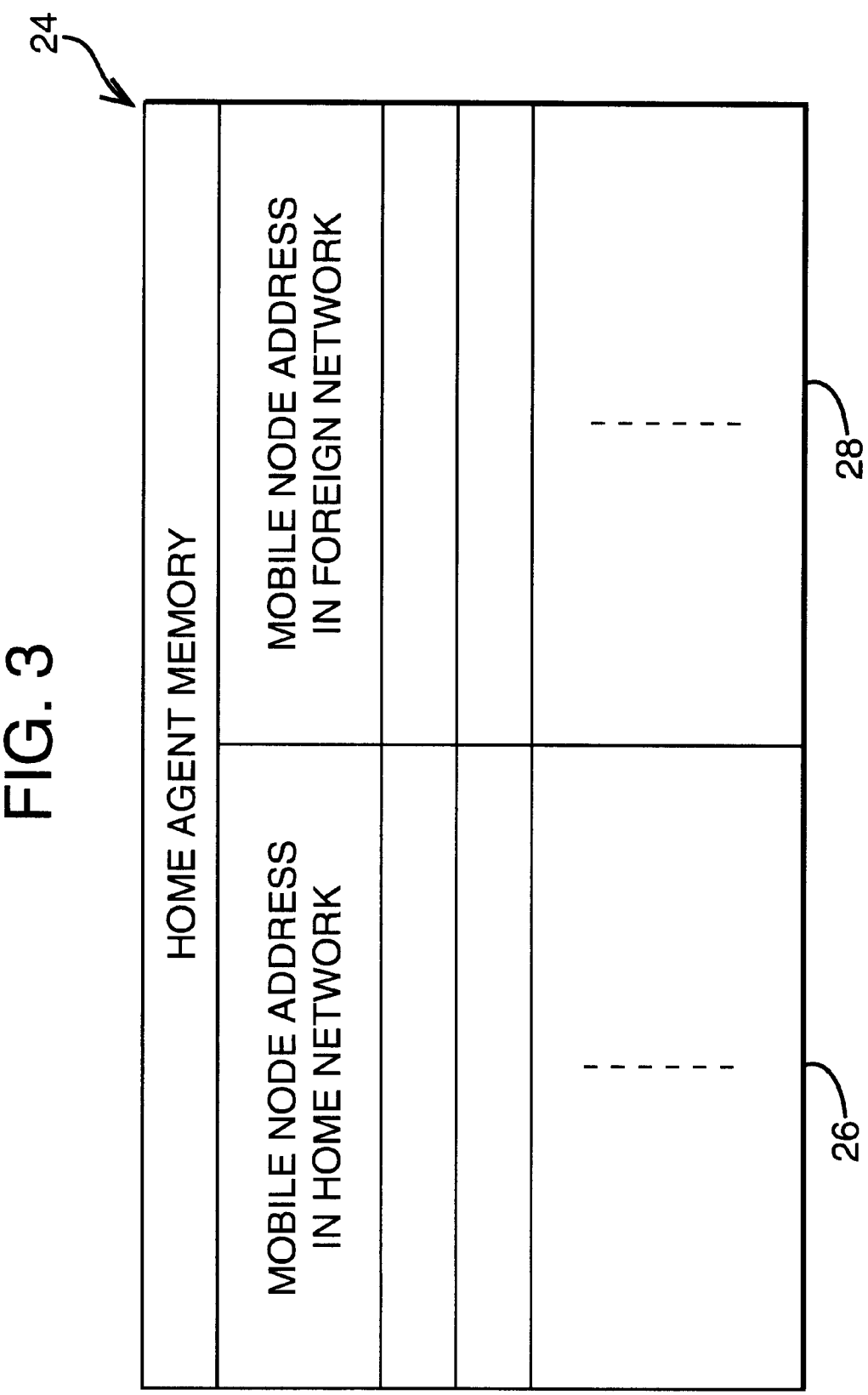

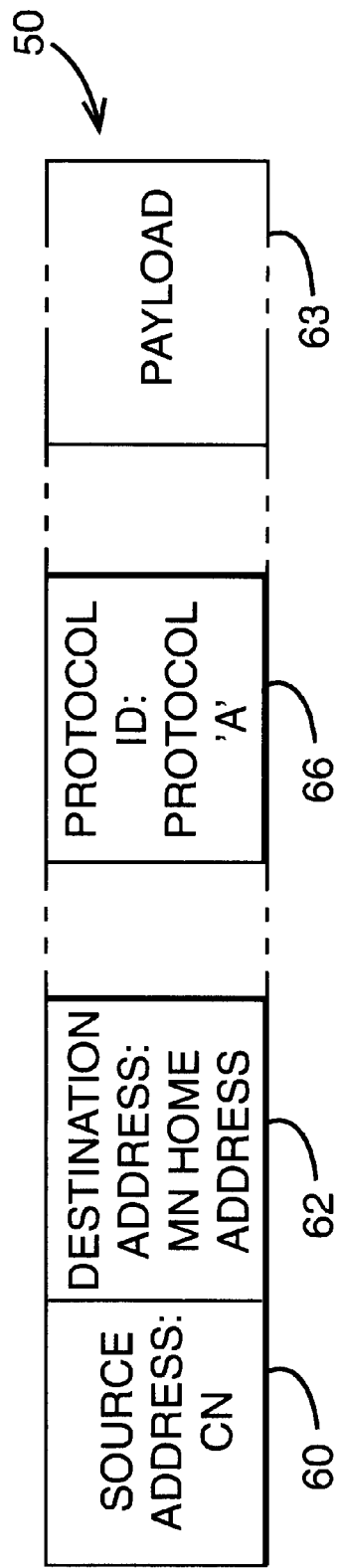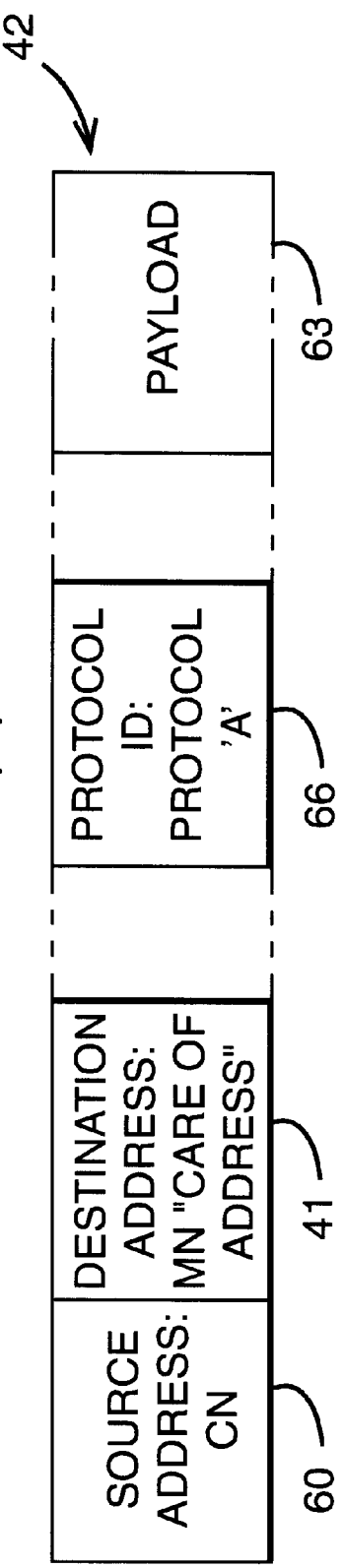

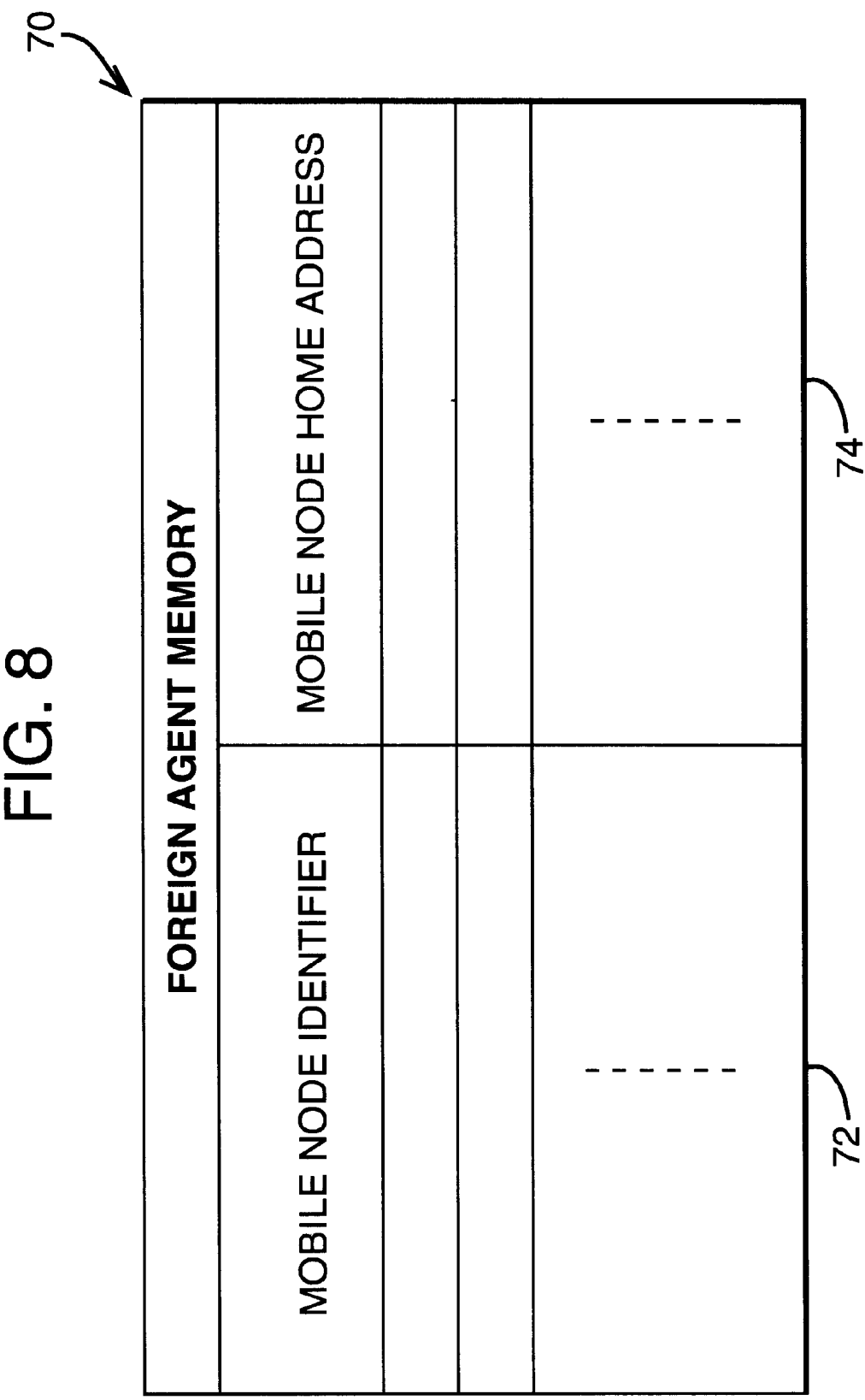

NON-ENCAPSULATION MOBILE IP

CROSS-REFERENCE TO RELATED APPLICATION

This application claims priority of European Patent Application No. 99301437.2 which was filed on Feb. 26, 1999.

FIELD OF THE INVENTION

The present invention relates to packets conforming to the Internet protocol and sent between host terminals in networks, and particularly to maintain the network connectivity between the host terminals when one host terminal moves from one network to another.

BACKGROUND TO THE INVENTION

Current internet protocol (IP) technology and mobile IP technology enables a host terminal or host node which is normally connected in a particular network (the nodes 'home' network) to temporarily connect into a different network (a 'foreign' network) and still receive IP packets or messages sent to the host terminal at its address in the home network. Such a host terminal which changes its point of network attachment is known as a mobile node.

To still receive IP packets in the foreign network the mobile node must register with a so-called 'home agent' in its home network. In registering with its home agent, the mobile node provides the home agent with a 'care-of' address where it can be addressed in the foreign network. The home agent then monitors traffic in the home network, and if the home agent identifies an IP packet that is carrying a destination address corresponding to the mobile node's home address in the home network, it intercepts the IP packet. The home agent then 're-packages' the IP packet and sends it to the node at the 'care-of' address in the foreign network.

The 'care-of' address may be a co-located care-of address or a foreign agent care-of address.

The technique of directing an IP packet, destined for an address in the home network, to a 'care-of' address in the foreign network is known, in mobile IP, as 'tunneling'. It is important in tunneling the IP packet to the 'care-of' address that certain information concerning the original IP packet is retained in the re-packaged IP packet. For example, as well as maintaining the original payload (or information portion) of the IP packet, the mobile node at the 'care-of' address must still be able to identify in, the 're-packaged' IP packet the source address from which the IP packet was originally sent and the home address of the mobile node in the home network.

One technique known in mobile IP for 'tunneling' an IP packet to a mobile node 'care-of' address encapsulates the original IP packet into a new IP packet as the IP packet payload. That is the original IP packet is incorporated as the payload (or information portion) of the new IP packet without any change to its content. The 'care-of' address is added to the new IP packet as the new destination address and the source address of the new IP packet is identified as the home agent. On receipt the mobile node at the 'care-of' address removes the 'wrapping' on the new IP packet to recover the original IP packet.

This technique suffers from a number of disadvantages. One disadvantage is that the 'repackaged' IP packet is longer than the original IP packet. Another disadvantage is that the repackaged IP packet does not facilitate the support of quality of service provisions in conformance with existing IP quality of service standards.

Each IP packet has associated therewith, and included in the IP packet, flow identification information which identifies the quality of service associated with the IP packet transmission. This flow identification information is present in fixed locations of the IP packet, where quality of service (QoS) capable routing/switching elements can locate it and operate in dependence on it. However, with the encapsulation tunneling technique the flow identification information included in the IP packet by the source originating the IP packet is not available between the home agent and the 'care-of' address.

Thus the fundamental problem with this encapsulation technique in conventional mobile IP (one of which is known as IP-in-IP encapsulation) is that it shields the real source address (i.e. the address of the correspondent node) and real destination address (i.e. the mobile node's home address), as well as the protocol ID in the IP packets, from the home agent to the mobile node. In addition, encapsulation mobile IP also changes the payload infrastructure (the original IP header becomes part of the payload) and fails flow differentiation if routers are not changed accordingly so as to be able to detect the modifications or changes. Changes or even slight modifications of routers often requires a large amount of re-design and re-placement of all existing routers. This far more complicates the control and management of the networks. It may also cause lots of problems in terms of security control and inter-operability.

It is therefore an object of the present invention to provide a 'tunneling' technique which enables the flow identification information included in the original IP packet transmitted by the source to be available throughout the routing of the IP packet to the mobile node's 'care-of' address.

SUMMARY OF THE INVENTION

Thus according to the present invention there is provided a method of directing an internet protocol IP packet to a mobile node, the mobile node having a home address in a home network and being temporarily connectable in a foreign network having a foreign agent, the IP packet having a header portion including the destination address to which the IP packet is to be sent, the method comprising the steps of: receiving, in the home network, the IP packet including a destination address corresponding to the home address of the mobile node; modifying the IP packet by: removing the home address of the mobile node from the header portion of the IP packet and replacing it with the foreign agent care-of address; appending a mobile node identifier to the IP packet; and transmitting the modified IP packet.

Thus the invention provides a new advantageous technique of non-encapsulation mobile IP (NEMIP) for tunneling IP packets conforming to existing mobile IP standards.

The technique maintains the necessary routing information to enable IP packets addressed to a mobile node in a home network to be forwarded to the current 'care-of' address of the mobile node in a foreign network, but at the same time maintains the flow identification information requested by the originator of the IP packet visible to all routing switches between the home network and the foreign network, as well as between the originator (known as the correspondent node) and the home network.

Advantageously, the present invention enables the flow identification information to be identified without having to make any changes to the routing switches. Standard routing switches can route the non-encapsulation mobile IP packets.

Advantageously, the present invention provides a tunneling technique where the simplicity of the header of the original IP packet is maintained, and the length of the new IP packet is minimised. This contrasts favourably with prior techniques where the length of the IP packet is significantly extended. The invention thus provides a simpler and shorter (one half) processing overhead than conventional techniques. It is therefore better suited for use across a radio link in a cellular/wireless network.

The non-encapsulation mobile IP technique of the present invention also increases transmission efficiency. This is particularly important in real-time multi-media applications, such as audio and video, which usually feature short but fast data packets. As a result it dramatically reduces the concern of using mobile IP to support wireless/mobile multimedia services.

Moreover non-encapsulation mobile IP according to the invention can be more easily adapted from IPv4 to IPv6 to support quality of service (QoS) than standard encapsulation techniques, due to the simpler and more straightforward IP packet tunneling.

Preferably the method of claim 1 further comprises the step of allocating a unique mobile node identifier to each mobile node in the foreign network. The step of allocating the unique mobile node identifier may be carried out by the foreign agent. The method may further comprise the step of notifying the home network of the unique mobile node identifier allocated to the mobile node in the foreign network.

The method may further comprise the step of storing the home address of the mobile node with the mobile node identifier in the foreign network.

The method may further comprise the step of receiving the modified IP packet in the foreign agent, and modifying the IP packet by: removing the address of the foreign agent from the header portion of the IP packet and replacing it with the home address of the mobile node; forwarding the IP packet to the mobile node in the foreign network.

The method may further comprise the step of comparing the unique mobile node identifier of the received modified IP packet to the stored mobile node identifier, wherein the removing and forwarding steps are carried out responsive to a match.

A plurality of mobile node's may be temporarily connected in the foreign network, and wherein a plurality of mobile node identifiers are stored in the with the home address of the mobile node.

The method may further comprise the step of storing the home address of the mobile node with the temporary address of the mobile node in the home network, wherein the step of receiving the IP packet further includes comparing the destination address to the stored home address. A plurality of home addresses may be stored together with a corresponding plurality of temporary addresses.

The header portion of the IP packet may further include the source address from which the IP packet was originally sent.

According to the present invention there is also provided, in a mobile IP environment, a mobile node having a home address in a home network and being temporarily connectable in a foreign network having a foreign agent, the home network of the mobile node having a home agent adapted to receive an IP packet having a destination address corresponding to the mobile node's home address, and being adapted, responsive to such IP packet, to modify the IP packet by: removing the home address of the mobile node from the IP packet and replacing it with the foreign agent's care-of address; and appending a unique mobile node identifier to the IP packet.

The foreign agent may include means for storing the unique mobile node identifier with the mobiles node's home address.

The home agent includes means for storing the unique mobile node identifier with the mobile node's home address and the foreign agent's care-of address.

The foreign agent may be adapted to allocate the unique mobile node identifier to the mobile node.

BRIEF DESCRIPTION OF THE FIGURES

FIG. 3 illustrates schematically a memory of a home agent of the home network;

FIG. 5(a) illustrates an IP packet constructed by the correspondent node for transmission to a mobile node in the home network, and FIG. 5(b) illustrates the modification of that IP packet to re-direct it to the foreign network according to a described implementation;

FIG. 8 illustrates schematically a memory of the foreign agent of FIG. 6; and

DESCRIPTION OF PREFERRED EMBODIMENT

Figure 1:
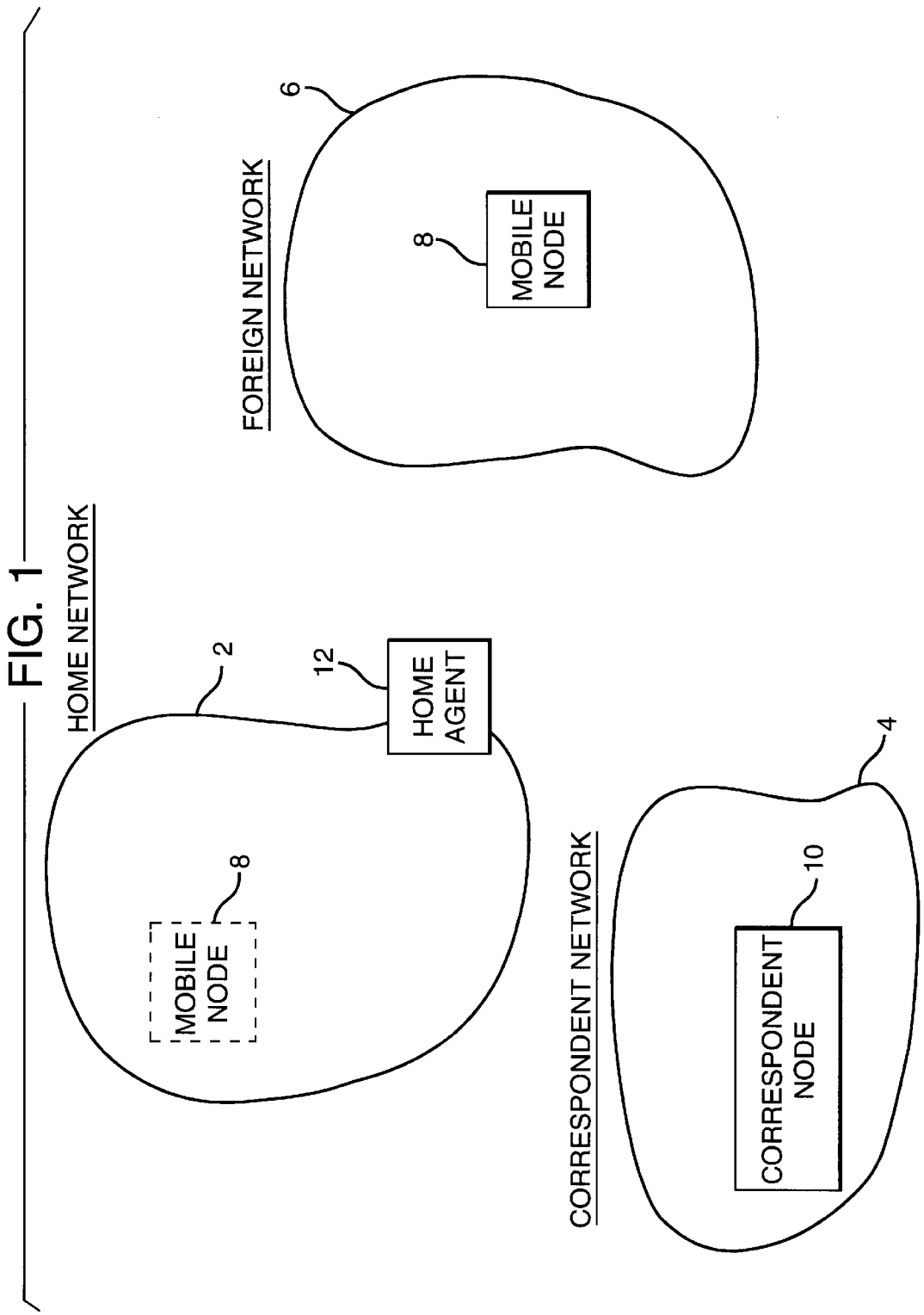
FIG. 1 illustrates a network set-up including a home network, a correspondent network, and a foreign network.

Referring to FIG. 1 there is shown a typical network set-up. A mobile node MN 8 to which an IP packet is to be sent is normally located in a home network 2. The mobile node MN 8 normally resides in the home network 2 at a particular address. This address is not necessarily a static IP address: the mobile node may be located at any physical point in the network, but a particular IP address is associated with the mobile node itself (rather than the physical point of connection). The home network may physically span a small office environment, or may span a number of countries.

The mobile node MN 8 may be connected to the home network 2 by a wireless LAN, infrared link, wireless telephone link or via a direct Ethernet or token ring network hook-up. The term 'mobile node' does not imply that the node is connected to the network via a wireless link: rather it implies that the mobile node may move outside the home network 2 into a foreign network such as the foreign network 6 of FIG. 1, as will be discussed in further detail hereinafter.

The arrangement of FIG. 1 also shows a correspondent network 4 including a correspondent node CN 10. For the purposes of illustrating the present invention, it is assumed that the correspondent node CN 10 of the correspondent network sends an IP packet to the mobile node 8 of the home network 2. The correspondent node may also be in a foreign network, that is a network independent of and distinct from the home network 2. However, the term foreign network is reserved for use to refer to a network which hosts a mobile node which normally resides in a different network (its home network). For the purposes of this illustrative example, the mobile node 8 of the home network 2 has moved to the foreign network 6. Thus the mobile node MN 8 is shown in the home network 2 in dashed lines to indicate that it is normally present there, and is shown in the foreign network FN 6 in a solid line to indicate that it is temporarily present in the foreign network 6.

The term's correspondent node and correspondent network are reserved for use to describe communication peers of the mobile node 8. A correspondent node is a node (which may be another mobile node) with which a mobile node is currently communicating: either receiving an IP packet or transmitting an IP packet. A correspondent network is used to refer to the network to which the correspondent node is connected. It should be appreciated that the mobile node may be communicating with a correspondent node in its own home network, and therefore the correspondent network may be the home network itself.

Figure 2A:
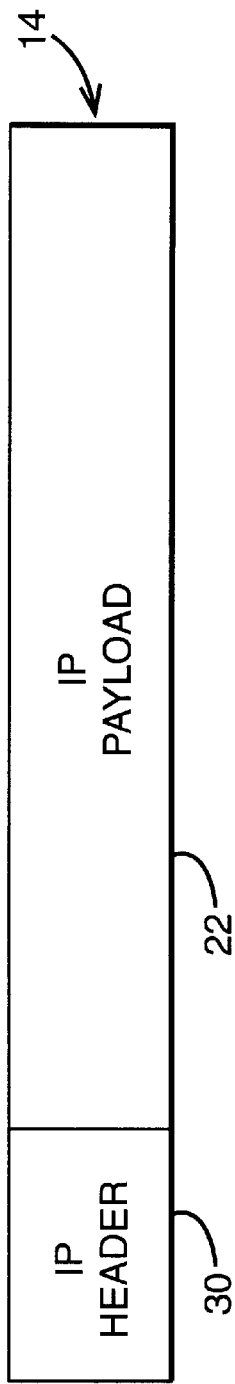
FIGS. 2(a) to 2(c) illustrate the standard format of an IP packet.
Figure 2B:
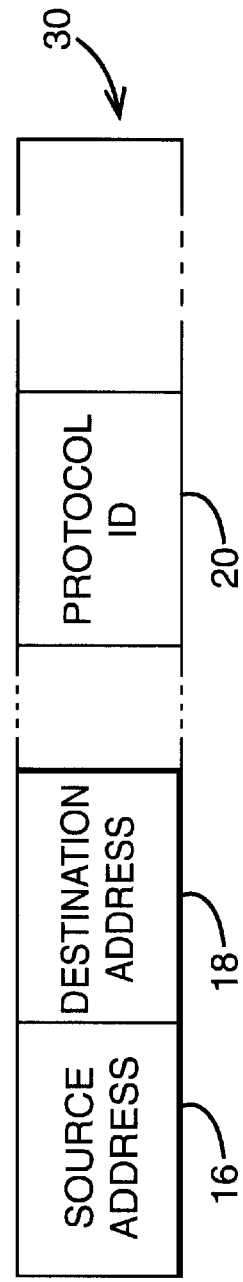
Figure 2C:
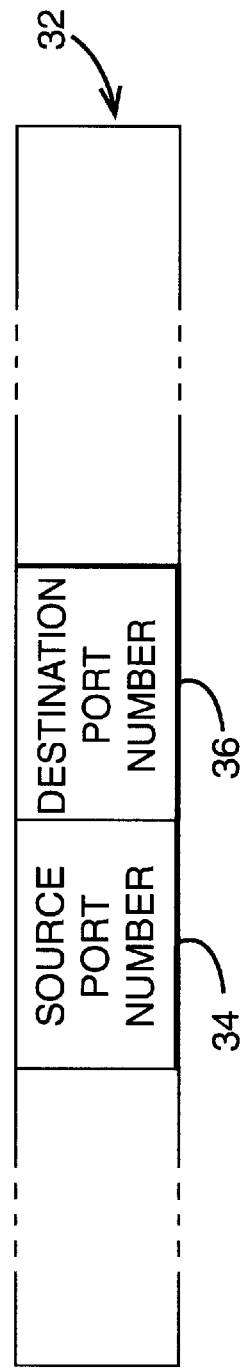

As can be seen from FIG. 1, and as will be discussed further hereinafter, the home network 2 further includes a home agent 12. A brief example of the 'normal' communication between the correspondent node CN 10 and the mobile node MN when the mobile node MN is normally resident in the home network will now be given. Referring to FIG. 2(*a*), there is shown the general structure of the IP packet 14 sent by the correspondent node CN 10 to the mobile node MN 8.

An IP packet transmitted between networks, generally designated by reference numeral 14 and illustrated in FIG. 2(*a*), comprises an IP header 30, and an IP payload 22. The IP payload 22 is the information portion of the IP packet to be delivered to the mobile node 8. The parts of the IP packet which are relevant to the present discussion are illustrated in FIGS. 2(*b*) and 2(*c*). The IP header 30, shown in FIG. 2(*b*), includes a source address portion 16, a destination address portion 18, and a protocol ID portion 20. The IP header 30 contains other fields which are not shown in FIG. 2(*b*) since they are not relevant to the present explanation.

Referring. to FIG. 2(*c*), the IP payload 32 includes a source port number 34 and a destination port number 36. Again, the IP payload includes other fields which are not relevant for the purposes of the present explanation.

The source address 16 is the IP address of the host terminal (correspondent node) from which the IP packet is sent, and the destination address 18 is the IP address of the host terminal (mobile node) to which the IP packet is to be sent. The source port number 34 is the port number used by an application at the correspondent node 10 associated with the IP packet 14. The destination port number is the port number used by an application of the mobile node 8 to which the IP packet is being sent. In addition to other uses, the protocol ID 20 is one of the indications of the quality of service to be supported in transmitting the IP packet from the source applications to the destination applications. As will be appreciated by one familiar with the art, the destination and source addresses are used by routing switches between the correspondent node and the mobile node in the home network to route the IP packet to its destination.

When the routers or routing switches support quality of service (QoS), in some QoS control provisions, such as RSVP and Intserve, the protocol ID 20 is used together with the source and destination addresses 16 and 18, plus the communication port numbers of end applications (i.e. the source port number 34 and the destination port number 36) for differentiating flows and imposing the necessary QoS control.

The QoS control imposed on the data traffic flows at the intermediate routers is system dependent. For example, it can be the so-called WFQ (Weighted Fair Queuing ) or CBQ (Classed Based Queuing). They are not standard and vendor specific but usually independent of the actual user's protocol ID.

The IETF's IntSer/RSVP standard is defined to provide a QoS specification and signaling mechanism but not a QoS control mechanism. Intserve/RSVP is independent of the actual QoS control mechanisms, such as WFQ, CBQ etc.

The status based on which QoS control is performed is set up in the routing switches prior to data transmission by means of the specific quality of service signaling protocol, e.g. RSVP.

A known way of routing an IP packet from the correspondent node to the mobile node MN 8 when it has moved to a position in the foreign network will now be described. When the mobile node MN 8 moves to a foreign network, it must register with the home agent HA 12 of the home network to still receive its IP packets when residing in the foreign network. This may be achieved by the mobile node sending a registration message to the home agent HA 12 once it has taken up position in the foreign network. A mobile node can be considered to have taken up position in the foreign network once it has been connected to the foreign network and been allocated a care-of address.

Referring to FIG. 3, the home agent HA 12 includes a memory or look-up table generally designated by reference numeral 24. In one column of the memory the home agent HA 12 stores the addresses of the mobile nodes normally resident in the home network that have registered with the home agent as being temporarily resident in a foreign network. In another column 28 of the memory 24 the home agent stores the 'care-of' address that the mobile node has moved to in the foreign network, as well as other associated states such as SPI (Security Parameter Index).

The technique by which the home agent records the current care-of address of the mobile node and its home address (i.e. the mobile node address in the home network) is usually implementation dependent. This invention does not exclude different approaches for achieving the location-awareness of a mobile node at the home agent.

The operation of the home agent in directing the IP packet from the correspondent node to the mobile node in the foreign network according to one current known technique will now be described.

The correspondent node CN 10 constructs an IP packet having a format identical to that shown in FIG. 2(*a*). The thus constructed IP packet from the correspondent node is illustrated by the IP packet 50 in FIG. 4(*a*), and includes a payload 63, a source address 60 identifying the correspondent node address, a destination address 62 identifying the home address of the mobile node in the home network, and a protocol ID 66, nominally referred to as protocol 'A'.

In the example shown in FIG. 1, after moving to the foreign network 6 the mobile node 8 is allocated a unique 'care-of' address of its own and registers directly with the home agent 12 in the home network. This is known as CO-COA (co-located care-of address) working mode. An alternative working mode known as FA-COA (foreign agent care-of address) working mode will be described hereinbelow with reference to FIG. 6. The manner in which the mobile node may register with the home agent is well-known in mobile IP, and is not relevant to the present invention and therefore not discussed herein. The IP packet constructed by the correspondent node 10 is identical whether the mobile node is positioned in its home network 2 or in the foreign network 6, as the correspondent node is not required to have knowledge of the movement of the mobile node. Mobile IP with route optimisation requires that the correspondent node is aware of the current location of the mobile node.

After a mobile node registers with the home agent using its current care-of address, the home agent will take a mobile node to be in a foreign network and starts intercepting the IP packets 50 destined to that mobile node home address and tunneling those IP packets to the mobile node's current care-of address.

The home agent monitors all IP packets coming into the home network to see if the destination address in the home network (the portion 62 of the IP header fields 52) matches one of the mobile node home addresses stored in column 26 of the home agent memory 24.

Figure 4A:
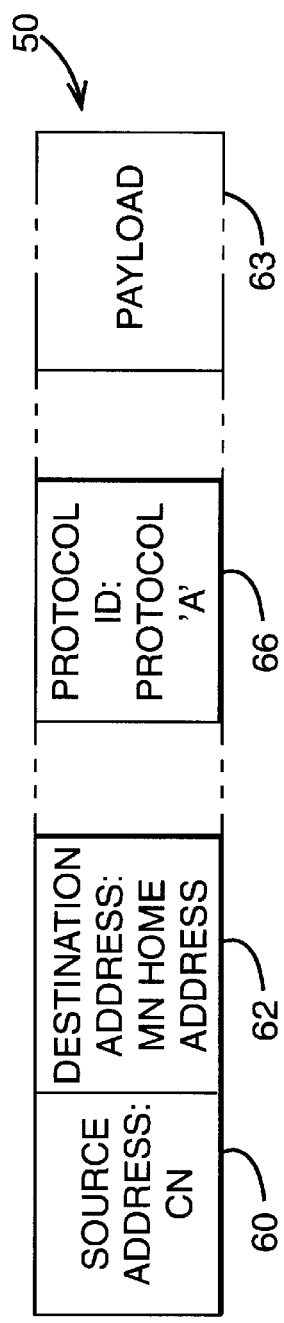
FIG. 4(a) illustrates an IP packet constructed by the correspondent network for transmission to a mobile node in the home network.
Figure 4B:
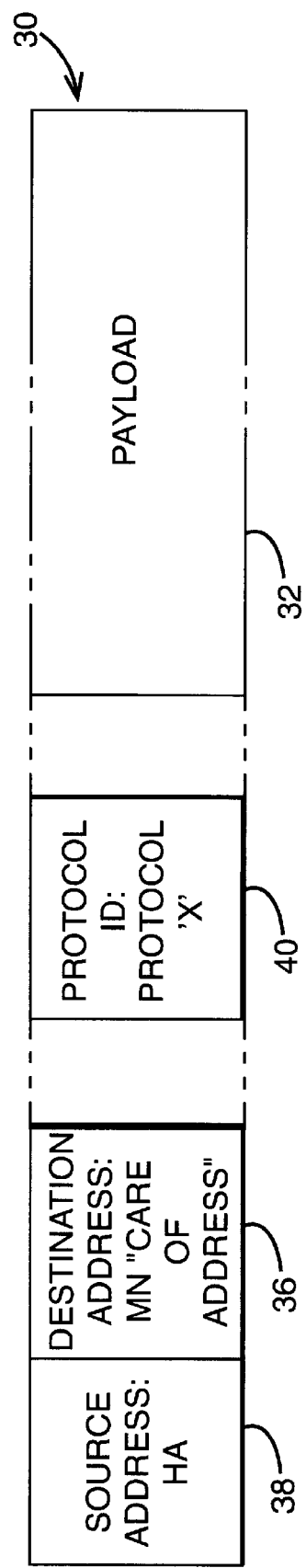
FIG. 4(b) illustrates the modification of that IP packet to re-direct it to the foreign network according to the prior art.

If a match is detected, the home agent creates a new IP packet, which is illustrated in FIG. 4(b). The original IP packet from the correspondent node, including the destination address, source address, protocol ID, and other IP header fields and payload is used to form part of the payload of the new IP packet. That is, the original IP packet is not processed at all by the home agent but is merely incorporated, wholly unchanged, as the payload 32 of the new IP packet 30.

The home agent then adds a destination address 36, source address 38 and protocol ID 40 to the new IP packet 30.

The destination address 36 is the address in the foreign network where the IP packet is to be sent, that is the 'care-of' address of the mobile node MN 8. The source address 38 is the address of the home agent from which the new IP packet 30 is being sent, i.e. the home agent.

The home agent protocol ID is the protocol ID determined by the home agent itself. The home agent will always attach the same protocol ID to the new IP packet 30 regardless of the protocol ID 20 included in the original IP packet by the correspondent node, since the home agent does not look at the protocol ID 20 of the original IP packet 14. The protocol ID 40 is designated nominally as protocol 'X'. For the conventional mobile IP's IP-in-IP's encapsulation, the protocol ID is always changed to "1" by the home agent.

Thus the 'real' source and destination addresses (60 and 62 of FIG. 4(a)) have been moved into the payload of the new IP packet and the other necessary flow identification information such as source and destination port numbers in the original IP payload have also been wrapped up in the payload of the new IP packet.

Thus, the original identity of a flow from the correspondent node to the mobile node is lost and quality of service fails as the IP packet is routed from the home agent to the foreign network.

The IP packet 30 is then sent by the home agent, and is routed to arrive at the mobile node's 'care-of' address in the foreign network. Once the IP packet 30 arrives at the 'care-of' address the mobile node strips the outer layers of the new IP packet 30 to reveal the original IP packet 50.

Thus, it can be appreciated that in this known arrangement, the required flow identification information including the protocol ID in the original IP packet is shielded by the home agent and thus becomes unrecognizable by the routing switches (or IP routers) for QoS provision between the home agent and the mobile nodes 'care-of' address.

The routing of an IP packet from the correspondent node to the mobile node's 'care-of' address according to an alternative preferred implementation will now be described. In the scheme according to this alternative preferred implementation, the flow identification and differentiation information such as the original source address, the original source and destination port number, and the source protocol ID placed in the original IP packet by the correspondent node remains unchanged and thus is advantageously available to all the routing switches between the correspondent node and the mobile nodes 'care-of' address.

The correspondent node constructs the IP packet 50 identically as before as shown in FIG. 5(a). On arrival at the home network, the home agent 12 determines whether the mobile node to which the IP packet is addressed is registered as having moved to a foreign network, by checking the contents of its memory 24 as before. On detection of the destination address in its memory column 26, the home agent intercepts the IP packet.

In this implementation, the home agent HA adapts the IP packet 14 by removing the destination address 62 of the mobile node 8 in the home network 2, and replacing it with the destination address (i.e. the 'care-of' address) of the mobile node MN 8 in the foreign network 6. The new IP packet 42 thus comprises the payload 63 of the original IP packet 50, the source address 60 of the original IP packet 50, and the source protocol ID 66 of the original IP packet 50. The destination address 62 of the original IP packet is replaced by the new destination address 41 (care-of address). Of course one familiar with the art will understand that it may be necessary to amend any error checking provided in the original IP packet 50 in view of the change in the destination address. The thus constructed new IP packet is sent to the 'care-of' address in the foreign network. The mobile node thus receives the original IP packet including the source address of the correspondent node, and the original source protocol ID as well as all other original flow identification information: it can be appreciated that as the payload remains unchanged, the source and destination port numbers are available in the same locations in the IP packet as before.

Figure 6:
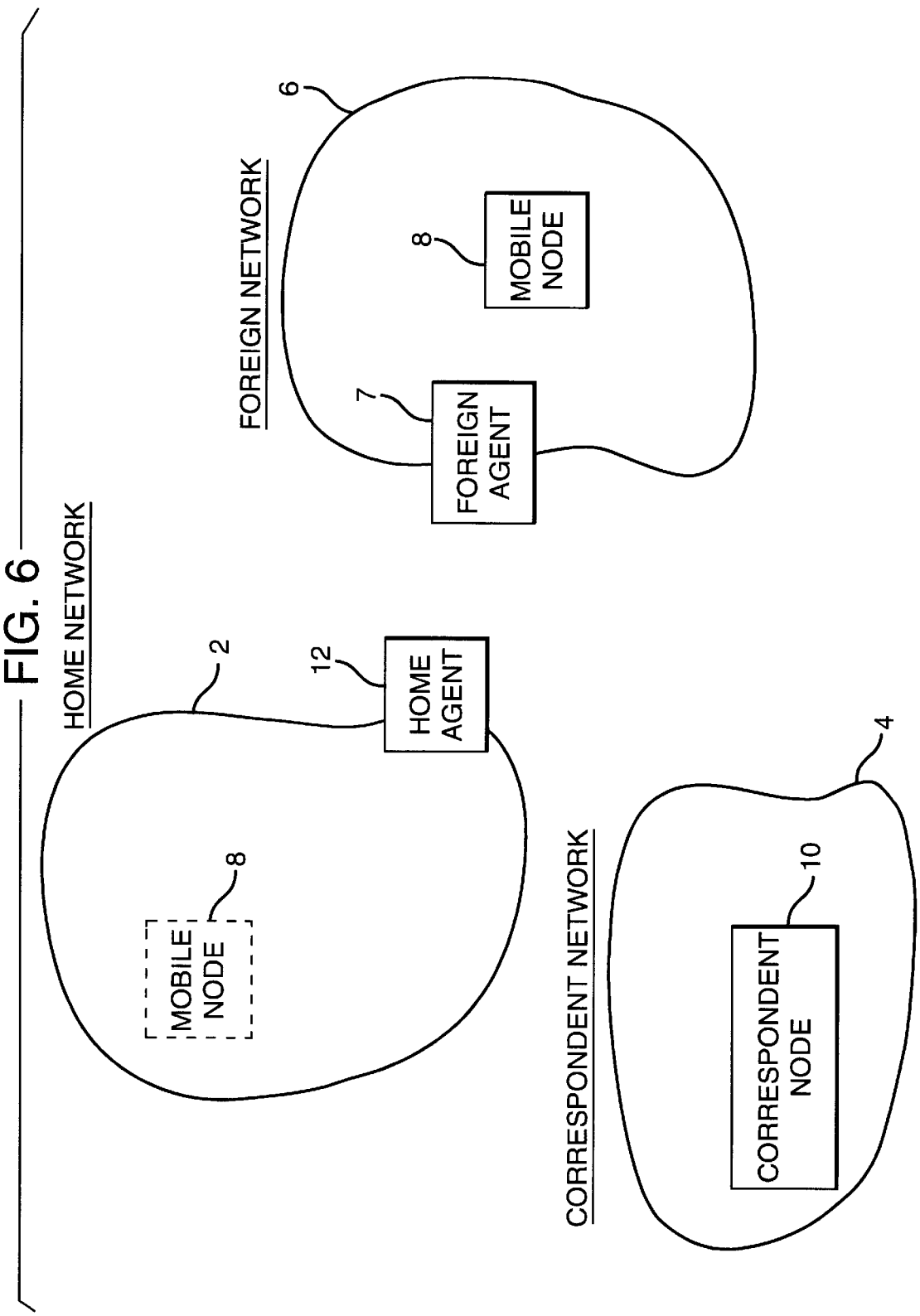
FIG. 6 illustrates the network set-up of FIG. 1 in which the foreign network includes a foreign agent.

The flow identification information is thus recognized as the IP packet from the same correspondent node featuring the same QoS requirements to the routers between the home agent and the 'care-of' address as well as between the correspondent node and the home agent regardless of the movement of the mobile node. Advantageously, in this arrangement (co-located care-of address working mode), the new IP packet 42 constructed by the home agent according to the present invention is the same length as the original IP packet provided by the correspondent node. Referring to FIG. 6 there is shown an alternative network set-up to that of FIG. 1. This network set-up is the same as that of FIG. 1, other than that the foreign network 6 is provided with a foreign agent 7.

In this arrangement, the mobile node registers with the foreign agent when it is positioned in the foreign network. The registration of the mobile node with the foreign agent is in accordance with standard mobile IP. The mobile node is aware that the foreign network has a foreign agent either by the foreign agent broadcasting its presence, or by the mobile node soliciting an acknowledgement from the foreign agent of its presence. Once the mobile node is aware of the existence of the foreign agent, it registers with the foreign agent in accordance with standard mobile IP. The foreign agent itself has a memory or look-up table. Referring to FIG. 8, the memory 70 of the foreign agent has a column 74 for storing the actual home IP address of a mobile node temporarily connected in the foreign network. The foreign agent additionally allocates to each mobile node registered with it a unique mobile node identifier (MNID) which can be used to distinguish between many mobile nodes registered with the foreign agent. The memory 70 of the foreign agent has an additional column 72 in which the unique mobile node identifier (MNID) associated with each mobile node's home address is stored.

Once a mobile node has registered with the foreign agent and the MNID allocated, based on the home address of the mobile node the foreign agent delivers the mobile nodes registration request to the home agent by means of which the home agent is notified of the mobile node's current care-of address and the MNID of the mobile node.

Figure 9:
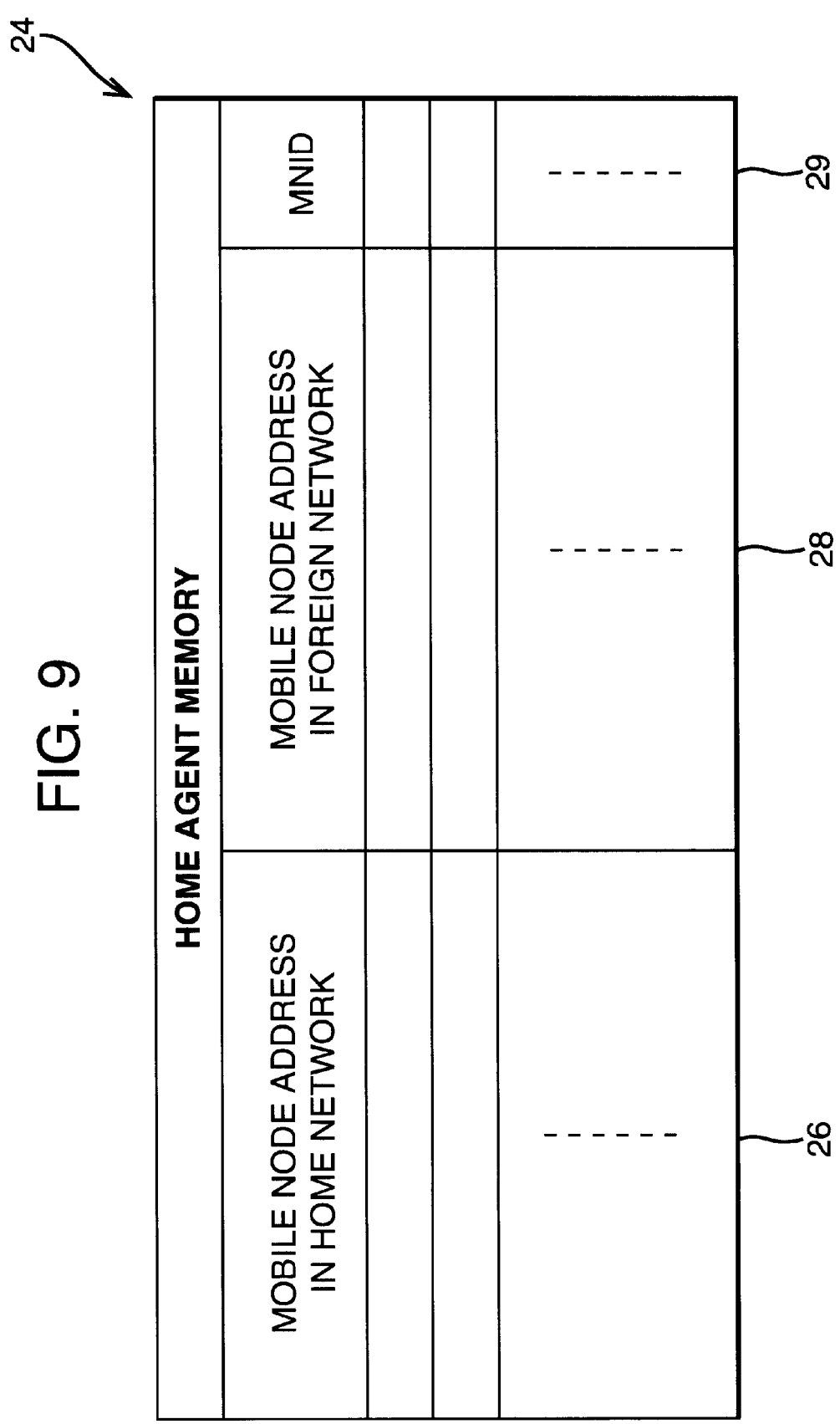
FIG. 9 illustrates schematically a modified memory of the home agent of FIG. 6.

The home agent then stores in its memory 24 the address of the foreign agent as the mobile node's address in the foreign network, and also stores with such address the unique mobile node identifier additionally communicated by the foreign agent. The memory 24 of the home agent is thus modified to store the MNID in a further column 29, as shown in FIG. 9.

Figure 7A:
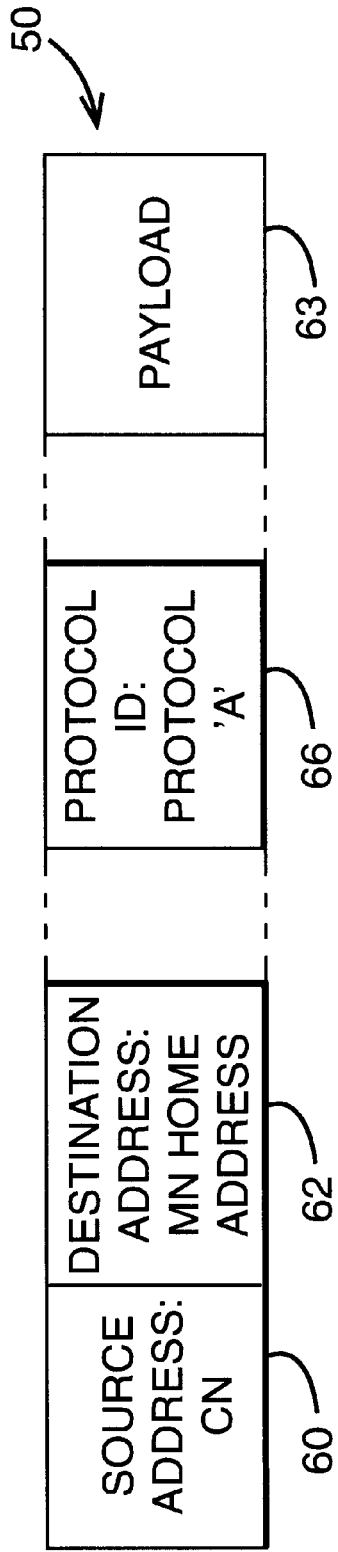
FIG. 7(a) illustrates an IP packet constructed by the correspondent node for transmission to a mobile node in the home network.
Figure 7B:
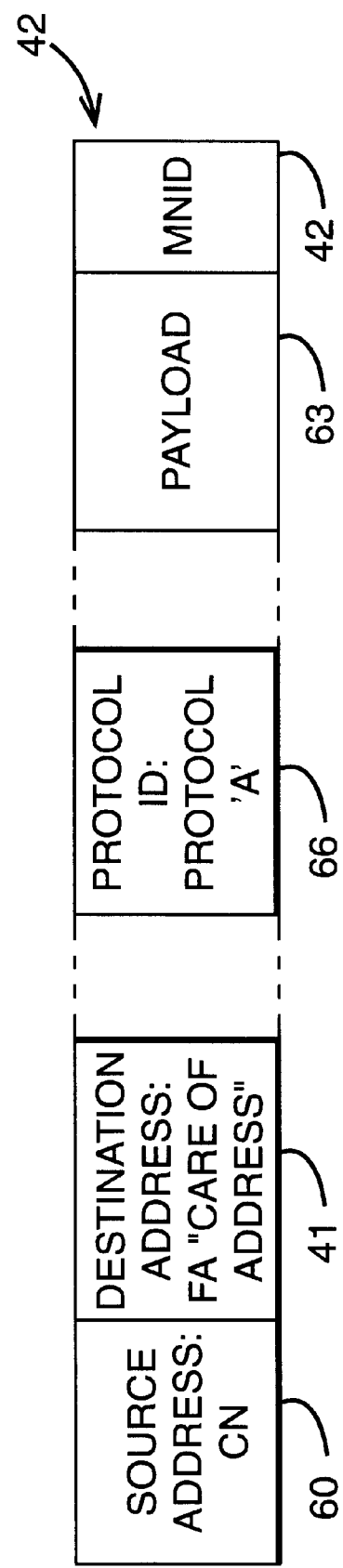
FIG. 7(b) illustrates the modification of that IP packet to re-direct it to the foreign network according to the present invention when the foreign network includes a foreign agent.

The correspondent node constructs the IP packet 50 identically as before as shown in FIG. 7(a). On arrival at the home network, the home agent 12 determines whether the mobile node to which the IP packet is addressed is registered as having moved to a foreign network, by checking the contents of its memory 24 as before. On detection of the destination address in its memory column 26, the home agent intercepts the IP packet.

In this implementation, the home agent HA adapts the IP packet 14 by removing the destination address 62 of the mobile node 8 in the home network 2, and replacing it with the destination address (i.e. the foreign agent 'care-of' address) of the mobile node MN 8 in the foreign network 6. This destination address will be the address of the foreign agent in the foreign network, and not the actual address at which the mobile node is currently attached. The new IP packet 42 thus comprises the payload 63 of the original IP packet 50, the source address 60 of the original IP packet 50, and the protocol ID 66 of the original IP packet 50. The destination address 62 of the original IP packet is replaced by the new destination address 41 (foreign agent care-of address).

In addition, the home agent appends the mobile node identifier for the mobile node as an extra field 43 to the message 42. It is essential, in non-encapsulation mobile IP, that when the IP packet is being redirected to a foreign network foreign agent, that a unique identifier for the mobile node be included. The destination address 41 is the address of the foreign agent, and not the address of the mobile node. Without the mobile node identifier the foreign agent is not able to distinguish which mobile node the IP packet is intended for.

The thus constructed new IP packet 42 is sent to the foreign agent 'care-of' address in the foreign network. The foreign agent receives the IP packet and retrieves therefrom the mobile node identifier 42 which is contained in the IP packet 42. The foreign agent compares the mobile node identifier in the IP packet to the mobile node identifiers in the column 72 of its memory, and retrieves the home address of the mobile node from the column 74. The foreign agent replaces the destination address (the foreign agent care-of address) in the IP packet with the mobile nodes home address and forwards the message on to the mobile node in the foreign network.

The technique described provides location independent connectivity to terminals which can move freely across different Internet protocol domains, while at the same time maintaining the correct flow identification information for quality of service provisions across the network nodes (i.e. the internet protocol routers).

What is claimed is:

1. A method of directing an internet protocol IP packet to a mobile node, the mobile node having a home address in a home network having a home agent and being temporarily connectable in a foreign network having a foreign agent, the IP packet having a header portion including the destination address to which the IP packet is to be sent, the method comprising the steps of: receiving, in the home network, the IP packet including a destination address of the home address of the mobile node; modifying by the home agent the IP packet by:

removing the home address of the mobile node from the header portion of the IP packet and replacing it with the foreign agent care-of address;
   appending a mobile node identifier to the IP packet; and transmitting the modified IP packet.

2. The method of claim 1 further comprising the step of allocating a unique mobile node identifier to each mobile node in the foreign network, the mobile node identifier appended to the IP packet being one of the unique mobile node identifiers.

3. The method of claim 2 wherein the step of allocating the unique mobile node identifier is carried out by the foreign agent.

4. The method of claim 2 further comprising the step of notifying the home network of the unique mobile node identifier allocated to the mobile node in the foreign network.

5. The method of claim 2 further comprising the step of storing the home address of the mobile node with the mobile node identifier in the foreign network.

6. The method of claim 5 further comprising the step of receiving the modified IP packet in the foreign agent, and modifying the IP packet by:

removing the address of the foreign agent from the header portion of the IP packet and replacing it with the home address of the mobile node;
   forwarding the IP packet to the mobile node in the foreign network.

7. The method of claim 6 further comprising the step of comparing the unique mobile node identifier of the received modified IP packet to the stored mobile node identifier, wherein the removing and forwarding steps are carried out responsive to a match.

8. The method of claim 5 wherein a plurality of mobile node's are temporarily connected in the foreign network, and wherein a plurality of mobile node identifiers are stored with the home address of the mobile node.

9. The method of claim 1 further comprising the step of storing the home address of the mobile node with the temporary address of the mobile node in the home network, wherein the step of receiving the IP packet further includes comparing the destination address to the stored home address.

10. The method of claim 9 wherein a plurality of home addresses are stored together with a corresponding plurality of temporary addresses.

11. The method of claim 1 wherein the header portion of the IP packet further includes the source address from which the IP packet was originally sent.

12. In a mobile IP environment a mobile node having a home address in a home network and being temporarily connectable in a foreign network having a foreign agent, the home network of the mobile node having a home agent adapted to receive an IP packet having a destination address corresponding to the mobile node's home address, and being adapted, responsive to such IP packet, to modify the IP packet by:

removing the home address of the mobile node from the IP packet and replacing it with the foreign agent's care-of address; and appending a unique mobile node identifier to the IP packet.

13. The mobile IP environment of claim 12 in which the foreign agent includes means for storing the unique mobile node identifier with the mobiles node's home address.

14. The mobile IP environment of claim 12 in which the home agent includes means for storing the unique mobile node identifier with the mobile node's home address and the foreign agent's care-of address.

15. The mobile IP environment of claim 12 in which the foreign agent is adapted to allocate the unique mobile node identifier to the mobile node.

* * * * *